United States Patent [19]

Ratschat

[11] 4,354,669
[45] Oct. 19, 1982

[54] APPARATUS FOR REGULATING THE QUANTITIES AND PERCENTAGES OF THE GASEOUS CONSTITUENTS OF OXYGEN, NITROGEN, CARBON DIOXIDE AND WATER IN REACTION PROCESSES IN METALLURGICAL APPLICATIONS

[75] Inventor: Günter Ratschat, Duisburg, Fed. Rep. of Germany

[73] Assignee: Mannesmann DeMag A.G., Duisburg, Fed. Rep. of Germany

[21] Appl. No.: 236,155

[22] Filed: Feb. 20, 1981

Related U.S. Application Data

[62] Division of Ser. No. 89,977, Oct. 31, 1979.

[30] Foreign Application Priority Data

Mar. 26, 1979 [DE] Fed. Rep. of Germany ....... 2911763

[51] Int. Cl.$^3$ ............................................. C21B 9/14
[52] U.S. Cl. ................................... 266/140; 266/141; 266/155; 266/186; 266/197; 266/900
[58] Field of Search .................. 266/81, 140, 141, 186, 266/197, 155, 900

[56] References Cited

U.S. PATENT DOCUMENTS

| | | | |
|---|---|---|---|
| 3,784,370 | 1/1974 | Stephenson, Jr. | 75/42 |
| 3,892,517 | 7/1975 | Ebeling et al. | 75/41 |
| 4,190,424 | 2/1980 | Armond et al. | 55/75 |

Primary Examiner—M. J. Andrews
Attorney, Agent, or Firm—Mandeville and Schweitzer

[57] ABSTRACT

An apparatus is provided for regulating the percentage quantities of individual gases present in the combustion air supplied for reaction processes in metallurgy. A molecular sieve absorption material is used on the intake air to absorb the inert constituents to thereby enhance the quantity of oxygen present. The apparatus utilizes several molecular sieve materials in a continuous manner such that one of the devices containing the molecular sieve material is being purged for regeneration while another device is absorbing the inert constituents, while yet another device is cooling, i.e., getting ready for the absorption operation. The countercurrent flow of heated intake air, which air is derived from the metallurgical reaction process, is used in the apparatus for regenerating the molecular sieve material.

12 Claims, 1 Drawing Figure

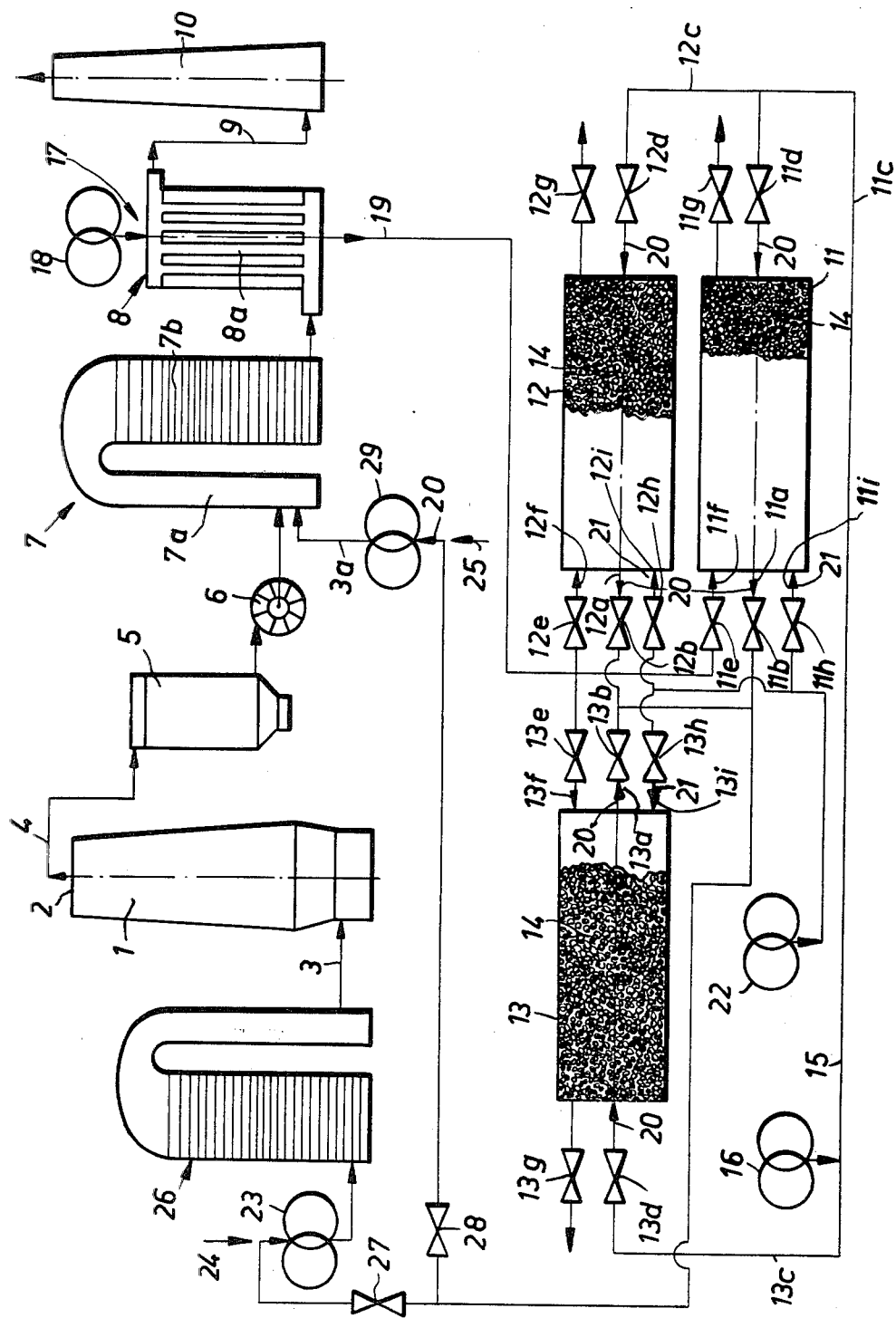

APPARATUS FOR REGULATING THE QUANTITIES AND PERCENTAGES OF THE GASEOUS CONSTITUENTS OF OXYGEN, NITROGEN, CARBON DIOXIDE AND WATER IN REACTION PROCESSES IN METALLURGICAL APPLICATIONS

This is a division of application Ser. No. 89,977, filed Oct. 31, 1979.

BACKGROUND OF THE INVENTION

The invention relates to a method and apparatus which is particularly useful for regulating the individual shares of gaseous constituents of oxygen, nitrogen, carbon dioxide and water in reaction processes in the metallurgical field. Such methods generally aim at savings in energy, and especially savings with respect to the use of expensive means for transporting energy supplies. The reasons for this may by availability, dependence on importation, environmental factors, potential risks during conveyance, and last but not least prices and costs of certain fuels. Accordingly, such methods also aim at the utilization of gaseous and liquid fuels which question the economy of metal extraction, particularly crude iron and/or steel production in metallurgical processes where high temperatures are involved.

In the reduction of ore approximately 3000 normal or standard cubic meters of air are required for the combustion of one ton of coke. The air quantity actually to be delivered is still higher by about 25% due to atmospheric moisture, and due to leaks in pipes and air heaters (e.g. in blast heaters in blast furnaces). In order to save fuel, such as coke, the air is heated to a maximum of 1,300° C. in air heaters. In order to heat the air, the blast furnace gas escaping from the metallurgical furnace is used with a coke gas additive which is burned in the air heater, thereby heating latticed refractory stones in the interior of the air heater to a maximum of 1,550° C. After the heating period, the gas burner is switched off, and the cold air, which is produced in blower engines at higher pressures, is blown through the hot latticed masonry of the air heater. The hot stones heat the air, which is then injected, into the blast furnace, via the hot blast annular conduit and the blast pipes. Two such blast heaters alternate in heat and blast periods. About 66% of the total energy of a metallurgical plant are used in the extraction of crude iron in blast furnaces. The coke consumption in the Federal Republic of Germany alone in the year of 1975 amounted to about 500 kilograms per ton of crude iron. In addition, about 60 kg of heavy diesel oil per ton of crude iron were injected.

The blast furnace gas at the blast furnace, however, is a gas low in calorific value (3,140 to 3,560 kJ/m$^3$). This disadvantage may be compensated for in order to obtain higher flame temperatures, usually by adding heavy gases, such as coke furnace gas. Other auxiliary means to obtain higher flame temperatures exist in the preheating of gas and/or combustion air. It has also been suggested to decrease the inert gas quantities in the combustion air (particularly nitrogen) by adding oxygen in order to save fuel and at the same time increase the output of the blast furnace.

The oxygen added previously in the blast furnace originates mainly with the low temperature distillation of atmospheric air, for which special oxygen extraction plants are required in metallurgical plants. on the other hand, metallurgical plants may also be connected to extensive oxygen conduit systems, which join the individual oxygen consumption points in the metallurgical plant with far removed oxygen extraction plants.

The mere addition of oxygen to the combustion air and/or to gases low in calorific value, in particular blast furnace gases, is therefore not only relatively involved, but, in addition, it does not solve the problem of the other attendant gaseous constituents present, such as for example the inert gases, and particularly nitrogen which has to be carried as ballast in the metallurgical process. The supply of pure oxygen is, furthermore, unable to solve the problem of the carbon dioxide and the water vapor in the combustion air.

The present invention is a new method and apparatus for regulating the individual quantities of combustion air constituents, including the content of oxygen, carbon dioxide, and water in reaction processes in metallurgy, making it possible to individually determine a desired composition of the combustion gas according to calorific value, temperature and combustion gas volumes required for any type of process. This is achieved by supplying the reduction processes and/or oxidation processes with a controllable quantity of air, where the oxygen share has previously been increased in relation to the existing oxygen share of the inlet air, by continuously absorbing by molecular screening and/or straining in a flow of nitrogen, carbon dioxide and water molecules in substances forming crystal lattices. This method has the advantage of, simultaneously with an enrichment of the combustion air in oxygen, reducing the share of gases not participating in the combustion, and even inhibiting the latter. Thus, the share of ballast and unnecessary gases which is often found to be disadvantageous in reduction processes and oxidation processes, is lowered considerably.

Another advantage is that this share is controllable depending upon the temperature level to be set. For use as the molecular screen, such substances are suitable which are able to bind larger quantities of water in the crystal lattice, and which may be removed continuously by simple heating without collapse of the crystal lattice. In an atmosphere containing water vapor, such drained crystals may again absorb water or, in its place, sulfur hydrogen, sulfur carbon, nitrogen, carbon dioxide, and other molecules. Such crystal lattices are known under the name of Zeolite. Since the natural Zeolites are not adequate for this purpose, synthetic Zeolites have been manufactured for about 50 years which fulfill the practical demands.

The special advantage of the method described lies, in short, in the use of substances forming crystal lattices, which are of corresponding pore sizes and crystal lattice structures where foreign molecules with smaller diameter than the hollow spaces of the lattice may be absorbed. The other advantage lies in the typically metallurgical application. For the latter, the method of the invention presents opportunities to introduce gases lower in ballast into reduction or oxidation processes, to introduce gases which are more intensly reactive, to completely utilize generally unused waste heat of reduction or oxidation processes, and to regenerate substances forming crystal lattices and pores. Furthermore, the invention produces far drier combustion gases, and finally provides for the carrying out of more intensive reduction and oxidation processes by producing oxygen-enriched air. The last advantage serves to intensify the processes, thereby increasing the output of metallurgical furnaces and combustion processs. One of these advantages, therefore, consists in obtaining higher temperatures—as far as required—in reduction and oxidation processes.

According to the invention, it is advantageous for the controlled air in quantity to be fed through a Zeolite molecular screen consisting of crystalline metal alumino-silicates. Such zeolite molecular screens are in themselves known. Their suitability for absorbing certain constituents attendant with the supply air which are undesirable in certain quantities in reduction processes and/or oxidation processes, has so far been overlooked. The method of the invention is furthermore improved in that the zeolite molecular screen is regenerated with air heated to temperature between 200° C. and 300° C., for urging nitrogen, carbon dioxide and water contents by molecular displacement in an air flow in opposite direction to the previously set up operational flow. It is, further, advantageous to carry out regeneration of the molecular screen in an alternating temperature method by periodic heating of the molecular screen. Also, regeneration of the molecular screen can be done by alternating pressure application by periodic lowering of the pressure of the air flow at a constant temperature.

As a further feature of the invention, provision is now made that the air enriched with oxygen is supplied to reduction processes in shaft furnaces (e.g. in a blast furnace) for the ore reduction or oxidation processes and/or reduction processes and/or smelting processes in steel mill converters, cupola furnaces and/or electro-furnaces for the refining of crude iron and/or smelting of metal scrap, iron sponge and/or for the extraction of nonferrous metals, as well as hot and glow furnaces for heating and heat treatment of metals. Another use of the method of the invention is that the air enriched with oxygen may be burned together with blast furnace gas in the combustion chamber of a blast heater, so that there is a saving of coke gas. Also, another use of the invention is that the oxygen-enriched air may be heated together with fresh air in a blast furnace blast heater.

The apparatus of the invention is formed so that a metallurgical furnace is preceded by several containers with molecular screen substances, which alternately may be connected to an air supply, and which are, furthermore, alternately connectable to a source of heat coupled with a cold air supply. The alternating connection is of advantage inasmuch as the molecular screens must be relieved from time to time from accumulated materials. With at least two containers with molecular screen substances there is always one ready for operation. During the operation period of one of the molecular screen containers, the other container or containers may be regenerated. To this end, the respective molecular screen containers are mounted to allow air flow in opposite directions depending upon whether they are receiving hot air or fresh air. In principle, the undesirable constituents attending the air, which are not to participate in the respective reaction, may be purged from the molecular screen container. To this end, it is useful that each molecular screen container be provided with an escape valve for nitrogen, carbon dioxide and water.

In a metallurgical operation where the metallurgical furnace operates as consumer and heat accumulates at the same time, the apparatus as per invention is suitably formed so that at least three molecular screen containers are provided with alternate connections between each other while being coordinated with a metallurgical furnace and/or combustion shaft. Suitably, the heat source for the regeneration ciruit of the molecular screen containers consists of a tube recuperator. For an extensive run of the processes in the molecular screen crystals, it is, furthermore, important that the molecular screen containers contain a heat-insulated steel jacket.

An example of the apparatus of the invention is shown in the drawing, wherein an example of the apparatus and the method of the invention is illustrated.

DESCRIPTION OF THE DRAWING

The single FIGURE illustrates an example of the invention by showing a schematic overall view of the form of a blast furnace plant which is not, or only partially, operated with pure oxygen from flow temperature distillation.

DETAILED DESCRIPTION OF THE INVENTION

The example shows as the metallurgical furnace a blast furnace 1, which might for other applications consist of a cupola furnace, a shaft furnace for nonferrous metal extraction, an electro-furnace, a steel mill, a nonferrous metal converter, or a hot and/or glow furnace for metals. For the reduction process, i.e. for the crude iron extraction, besides the iron ores and additives charged from above through the charge lock 2, coke is required as the carbon carrier whose share must be kept down due to the high cost involved. The saving in coke is realized according to the invention by means of the air-oxygen supply 3. The blast-furnace gas 4 originating in the blast furnace 1 travels through the coarse dust removal plant 5, the fine dust removal plant 6, and then reaches the combustion shaft 7a of the blast heater 7 in a purified state. This oxidation process is also, in accordance with the invention supplied with oxygen-enriched air via the air-oxygen supply 3a, as the blast-furnace gas 5 loses heat on the way down to and through the dust removal plants 5 and 6 and also contains, besides, still combustible carbon monoxide and carbon dioxide gas, thus having a relatively low calorific value. The hot combustion gases originating in the combustion shaft 7a heat the latticed masonry 7b of the blast heater 7 and subsequently flow through the tube recuperator 8a representing a source of heat yet to be described. The combustion gases leaving the tube recuperator 8a are at a low temperature level, and are discharged to the open air via the gas conduit 9 and the stack 10.

For reasons of technological functioning, the containers 11, 12, and 13, made of heat-insulated steel sheets, are arranged before the blast furnace 1. Each of the containers holds molecular screen substances 14. In the example shown, these consist of zeolite substances forming crystal lattices of the calcium type with 5 angstrom pore size (1 angstrom = $1 \times 10^{-7}$ mm). Each of the containers 11, 12, and 13 is connected to the blast furnace 1 via an air-oxygen conduit 11a, 2a, 13a, whereby valves 11b, 12b, and 13b open and close. Each of the containers 11, 12, 13 is further connected to an air supply 15, whereby the blower 16 feeds the air via the conduit 13a, with shutoff valve 13d to the container 13, via the conduit 11c with shutoff valve 11d to the container 11, and via the conduit 12c with shutoff valve 12d to the container 12.

Another fresh air supply 17 is provided before the source of heat 8, whereby the blower 18 feeds the air through the tube recuperator 8a, so that the air flows through conduit 19 preheated, and is fed by means of the valve 11e and the conduit 11f to the container 11, by means of the valve 12e and the conduit 12f to the container 12, and by means of the valve 13e and the conduit 13f to the container 13. In the direction of flow, there is an outlet valve 11g, 12g, 13g, at the outlet of the containers 11, 12, 13.

A flow direction shown by arrows 21 opposite to the operational flow direction shown by arrows 20 is produced by the blower 22 which delivers cold air, whereby the air flows via the valve 11h, the conduit 11i into the container 11, via the valve 12h, the conduit 12i into the container 12, and via the valve 13h and the conduit 13i into the container 13.

Furthermore, the blower 23 is cut into the air-oxygen supply 3 and also another mixed air supply 24. A similar blower 29 with a similar mixed air supply 25 is located in the air-oxygen supply 3a. Between the blower 23 and the blast furnace 1 a second blast heater 26 is inserted which operates alternately with the blast heater 7 heating the oxygen-enriched air before it is injected into the blast furnace 1.

Having described the individul components of the invention, the following describes the mode of operation of the apparatus for carrying out the method of the invention. With reference to the container 13, we proceed on the basis that it contains absorbing molecular screen substances 14. This means that the container 13 is able to absorb nitrogen, carbon dioxide and water vapor. In this phase, the valves 13e, 13g, and 13h are closed. Fresh air now flows via the blower 16 through the conduit 13c, via the opened valves 13d and 13b in operational flow direction 20 and the air in container 13 is relieved of carbon dioxide, atmospheric moisture and a large share of nitrogen. The air is thus enriched to 70 to 90% oxygen and regulated in the desired quantity before adding it to the intake air of the blower 23. The oxygen-enriched blast is heated in the blast heater 26 and fed to the blast furnace 1 via the air-oxygen supply 3. This mode of operation is carried out, depending on the capacity for adsorption of the molecular screen substances 14 individually and successively with the containers 11, 12 and 13.

The regeneration of a container no longer capable of adsorbing, such as the container 12, for example, is then carried out as follows: in the first stage of regeneration, air flows through the tubes of the source of heat 8, here being the tube recuperator 8a, in countercurrent to the hot waste gases from the combustion shaft 7a and/or the latticed masonry 7b. The air is delivered by the blower 18, which is heated in the tube recuperator 8a to a temperature of 200° to 300° C., and enters through the conduit 19 with opened valve 12e into the container 12 and escapes through the opened valve 12g to the outside. This prepares the molecular screen substances 14 for the subsequent adsorption of nitrogen. This first step in the method to prepare the crystals for the adsorption of nitrogen is also carried out for the containers 11 and 13, only at different times.

In the second stage of the regeneration, a container such as 11, heated in this manner, is now cooled to ambient temperature by means of blowing fresh air with the blower 22 with open valve 11h through the conduit 11i and the container 11. In this phase, valves 11b, 11d, and 11e are closed. The fresh air supplied leaves the container through the open valve 11g. After cooling the container 11 is again at disposal for oxygen-enrichment of the supplied air.

In a selected time period, the molecular screens may be thus heated in the container 12 to 200° to 300° C., while in the container 11 the molecular screen is cooled to ambient temperature, and in the container 13 oxygen-enriched air is provided by adsorption of the nitrogen as well as the carbon dioxide and the water vapor.

The valve 27 is open when the blast furnace 1 is operated with oxygen-enriched air. Otherwise the valve 27 is closed. The valve 28 is open when the blast heater 7 is operated during the heating period with oxygen-enriched air. Otherwise the valve 28 is closed.

I claim:

1. An apparatus for regulating the absolute amount of oxygen and relative percentages of individual gaseous constituents of a gas stream provided to a metallurgical reaction furnace, comprising:
   (a) at least one container;
   (b) each of said containers having molecular screening substances contained therein;
   (c) each of said containers being provided with an ambient air inlet conduit;
   (d) each of said containers also being provided with an outlet conduit for removal, from said container, of an oxygen enhanced gas stream; and
   (e) said outlet conduit being connected to a metallurgical reaction furnace.

2. An apparatus as claimed in claim 1, wherein:
   (a) said outlet conduit is first connected to a gas stream heater for heating said oxygen enhanced gas stream prior to introduction to said metallurgical reaction furnace.

3. An apparatus as claimed in claim 1, wherein:
   (a) said inlet and outlet conduits are provided with shutoff valves;
   (b) said inlet and outlet conduits defining a first flow direction;
   (c) said containers being also provided with rejuvenating conduits and valves; and
   (d) a source of heated air is connected to said rejuvenating conduits such that said source of heated air can be passed through said containers and molecular screening substances.

4. An apparatus as claimed in claim 3, wherein said rejuvenating conduits and valves direct said heated air in countercurrent direction to said first flow direction.

5. An apparatus as claimed in claim 3, wherein said source of heated air comprises:
   (a) an air blower; and
   (b) a heat recovery device, said heat recovery device being connected to the exhaust of said metallurgical reaction furnace.

6. An apparatus as claimed in claim 5, wherein:
   (a) said heat recovery device is a tube recuperator.

7. An apparatus as claimed in claim 3, wherein:
   (a) cooling conduits and valves are provided to said container for passing cooled air through said container.

8. An apparatus as claimed in claim 6, wherein:
   (a) said cooling conduits and valves direct said cooled air through said container in a direction counter to said first flow direction.

9. An apparatus as claimed in claim 8, wherein:
   (a) said cooling conduits and valves are provided with a source of cooling air which comprises an air blower.

10. An apparatus as claimed in claim 1, wherein:
    (a) the number of said containers is three; and (b) said containers are interconnected to one another such that, simultaneously
  (i) the first of said containers provides said oxygen enhanced gas stream to said metallurgical reaction furnace, while
  (ii) the second of said containers is being purged by the passage of heated air through said second container and molecular screening substance, while
  (iii) the third of said containers is being readied for reuse by the passage of cooling air through said third container and molecular screening substance.

11. An apparatus as claimed in claim 1, wherein:
(a) said containers are provided with heat insulating jackets.

12. An apparatus as claimed in claim 1, wherein:
(a) said molecular screening substances are crystalline metal aluminum silicates.

* * * * *